Aug. 30, 1966  E. H. GARWOOD  3,269,050
FISHING LURE
Filed Sept. 24, 1964

INVENTOR.
ERNEST H. GARWOOD
BY
ATTORNEY 3,269,050
FISHING LURE
Ernest H. Garwood, 240 W. 33rd Way,
Long Beach, Calif.
Filed Sept. 24, 1964, Ser. No. 398,863
2 Claims. (Cl. 43—42.33)

This invention relates to a fishing lure, and particularly one in which the body is formed of a transparent material, and an inner light reflecting element is provided to produce color and a simulated movement in the water.

An object of my invention is to provide a novel fishing lure in which the main body is hollow and is formed of a transparent material, such as plastic, and in which an inner element is mounted within the hollow body, this inner element having a reflecting outer surface and also may be formed of a heavy material to act as a weight.

Another object of my invention is to provide a novel fishing lure in which the inner element also acts as a guide for the fishing line, in that it has a hole or bore extending lengthwise through it. Also the inner body may be hermetically sealed by sealing the cap member of the body in position, so that the inner element in the fishing lure will not deteriorate nor become discolored.

Other objects, advantages and features of invention may appear from the accompanying drawing, the subjoined detailed description and the appended claims.

Figure 1:
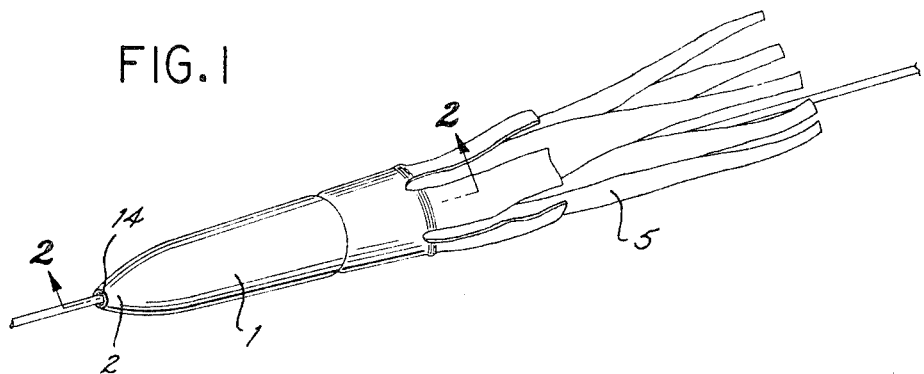
FIGURE 1 is a perspective view of my fishing lure.
Figure 2:
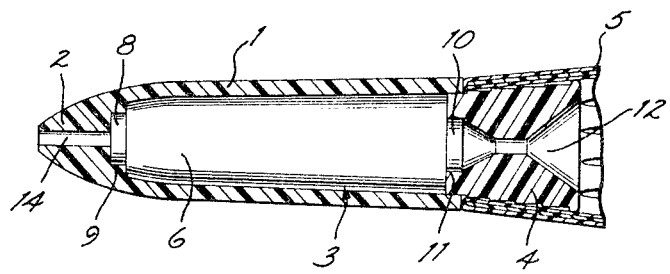
FIGURE 2 is a sectional view taken on line 2—2 of FIGURE 1.
Figure 3:
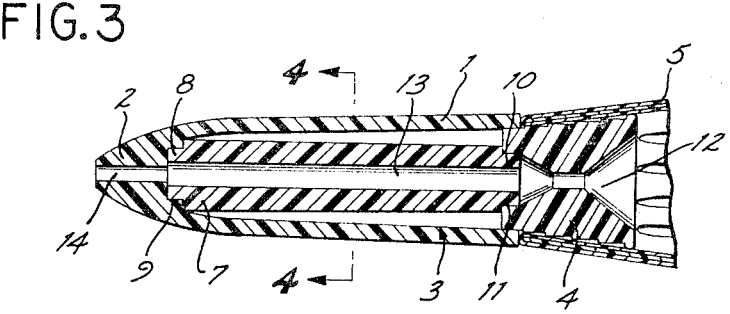
FIGURE 3 is a longitudinal sectional view of my fishing lure illustrating a smaller inner element.
Figure 4:
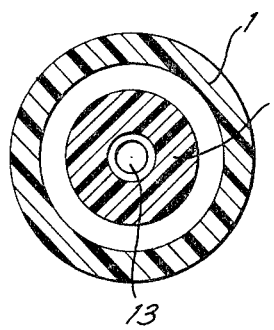
FIGURE 4 is a sectional view taken on line 4—4 of FIGURE 3.

Referring more particularly to the drawing, the numeral 1 indicates a main outer body of my fishing lure, which is preferably cylindrical in shape and is closed at one end, as shown at 2. The body 1 is hollow and is formed with a counterbore 3 which extends partially through this body. The body is preferably formed of a moldable plastic and is transparent. A cap 4 encloses the one end of the body 1, and in the final assembled form the cap 4 is sealed into the body 1 by means of a suitable adhesive. Lure strips 5 may be attached to the periphery of the cap 4 to simulate a squid when in the water. An inner element 6 is positioned within the body 1 and this element may be formed of a heavy substance, such as lead, and may be differently sized to vary the weight of the lure as required. The outer diameter of the element 6 is smaller than the bore 3 of the body 1, so that light when passing through the body 1 will be more effectively reflected from the outer surface of the element 6. The inner element may also be formed of a plastic, as shown at 7, and may be colored if it is found expedient. The inner elements 6 and 7 are each formed with a projection 8 at one end which fits into a seat 9 in the body 1. At the other end the elements 6 and 7 are each formed with a projection 10 which fits into a socket 11 in the cap 4. The inner elements 6 and 7 are thus accurately held in proper position and alignment within the body 1 of the lure. A bore 12 is provided in the cap 4 to accommodate the fishing line. The inner elements 6 and 7 are each provided with a longitudinal hole 13 extending lengthwise therethrough and aligned with the bore 12. The body 1 is provided with an outlet hole 14 in the tip end 2 and thus the fishing line has free access lengthwise through the entire lure.

Once the inner element 6 has been assembled within the body 1, the cap 4 is then pressed into position and is hermetically sealed to the body 1 by a suitable adhesive. Thus when the lure is in the water it cannot leak and water will be excluded from the inside of the body 1, thus preventing deterioration or tarnishing of the inside of the body 1 and particularly the weight or inner element 6 or 7.

Having described my invention, I claim:

1. A fishing lure comprising,
a hollow body having a counterbore therein extending substantially the length of the body,
a cap mounted on one end of the body to close the same,
an inner element mounted in the body and extending for substantially the length of the counterbore,
said body and cap each having a socket formed therein to receive one end of said inner element,
said body, cap, and inner element having aligned longitudinally extending bores therein through which a fishing line extends,
said inner element being of lesser outside diameter than the diameter of the counterbore.

2. A fishing lure comprising,
a hollow body having a counterbore therein,
a cap mounted on one end of the body to close the same,
an inner element mounted in the body,
said body and cap each having a socket formed therein to receive one end of said inner element,
said body, cap, and inner element having aligned longitudinally extending bores therein through which a fishing line extends,
said inner element being of lesser outside diameter than the diameter of the counterbore.

References Cited by the Examiner
UNITED STATES PATENTS

| | | | |
|---|---|---|---|
| 1,612,264 | 12/1926 | Cressey | 43—42.33 |
| 2,510,566 | 6/1950 | Flaherty | 43—42.09 |
| 2,529,642 | 11/1950 | Vaughn et al. | 43—42.09 |
| 2,862,325 | 12/1958 | Magnus | 43—42.36 XR |

ABRAHAM G. STONE, *Primary Examiner.*

R. L. HOLLISTER, *Assistant Examiner.*